US010296508B2

(12) United States Patent
Herbst et al.

(10) Patent No.: US 10,296,508 B2
(45) Date of Patent: May 21, 2019

(54) SYSTEMS AND METHODS TO MANAGE ONLINE ANALYTICAL AND TRANSACTIONAL PROCESSING FOR AN IN-MEMORY COLUMNAR DATABASE

(71) Applicants: Axel Herbst, Eppingen-Rohrbach (DE); Heiko Gerwens, Heidelberg (DE)

(72) Inventors: Axel Herbst, Eppingen-Rohrbach (DE); Heiko Gerwens, Heidelberg (DE)

(73) Assignee: SAP SE, Walldorf (DE)

( * ) Notice: Subject to any disclaimer, the term of this patent is extended or adjusted under 35 U.S.C. 154(b) by 437 days.

(21) Appl. No.: 13/911,332

(22) Filed: Jun. 6, 2013

(65) Prior Publication Data
US 2014/0365424 A1    Dec. 11, 2014

(51) Int. Cl.
*G06F 16/2455* (2019.01)
*G06F 16/28* (2019.01)
*H04W 52/02* (2009.01)

(52) U.S. Cl.
CPC ...... *G06F 16/24561* (2019.01); *G06F 16/283* (2019.01); *H04W 52/0209* (2013.01); *Y02D 10/45* (2018.01); *Y02D 70/00* (2018.01)

(58) Field of Classification Search
CPC ......... G06F 17/30008; G06F 17/30501; G06F 17/30592; G06F 16/24561; G06F 16/283; H04W 52/0209; Y02B 60/188; Y02B 60/50; Y02D 10/45; Y02D 70/00
USPC ............................................... 707/607, 609
See application file for complete search history.

(56) References Cited

U.S. PATENT DOCUMENTS

| 4,703,422 | A | 10/1987 | Kinoshita et al. |
| 6,032,224 | A | 2/2000 | Blumenau |
| 6,324,620 | B1 | 11/2001 | Christenson et al. |
| 7,155,467 | B1 | 12/2006 | Rohrs |
| 7,593,522 | B2 | 9/2009 | Parker-Stephen |
| 7,974,967 | B2 * | 7/2011 | Scheuermann ............... 707/713 |
| 8,156,304 | B2 | 4/2012 | Friedman et al. |

(Continued)

FOREIGN PATENT DOCUMENTS

| EP | 11149516 A | 6/1999 |
| JP | 11-149516 A | 6/1999 |

OTHER PUBLICATIONS

"Communication: Extended European Search Report", European Patent Office, dated Oct. 14, 2014, for European Application No. 14171203.4-1855, 8pgs.

(Continued)

*Primary Examiner* — Pierre M Vital
*Assistant Examiner* — Andalib F Lodhi
(74) *Attorney, Agent, or Firm* — Buckley, Maschoff & Talwalkar LLC

(57) ABSTRACT

According to some embodiments, a database, containing entries, may be stored across first and second storage medium, entries in the second storage medium being default invisible for online transactional processing. A central software layer processor between the database and an application may identify a subset of the entries stored in the first storage medium as being default visible for online transactional processing, wherein entries stored in the first storage medium that are not within the subset are default invisible for online transactional processing. Note that entries in the first storage medium may be accessible by the application more quickly as compared to entries in the second storage medium.

20 Claims, 7 Drawing Sheets

(56) References Cited

U.S. PATENT DOCUMENTS

| | | | |
|---|---|---|---|
| 8,447,016 | B1 | 5/2013 | Kugler et al. |
| 8,554,651 | B2 * | 10/2013 | Rinne .................. G06Q 20/02 705/1.1 |
| 2008/0005475 | A1 | 1/2008 | Lubbers et al. |
| 2008/0133456 | A1 | 6/2008 | Richards et al. |
| 2009/0319546 | A1 * | 12/2009 | Shaik ............................ 707/101 |
| 2011/0314071 | A1 | 12/2011 | Johnson et al. |
| 2012/0173515 | A1 | 7/2012 | Jeong et al. |
| 2012/0174124 | A1 * | 7/2012 | Ward et al. .................... 719/331 |
| 2012/0296883 | A1 * | 11/2012 | Ganesh et al. ................ 707/693 |
| 2013/0073513 | A1 | 3/2013 | Kemper et al. |
| 2013/0226959 | A1 | 8/2013 | Dittrich et al. |
| 2014/0089257 | A1 * | 3/2014 | Ignacio ................ G06F 17/303 707/609 |
| 2014/0095438 | A1 * | 4/2014 | Marwah ........... G06F 17/30073 707/639 |
| 2014/0114906 | A1 | 4/2014 | Hegde et al. |
| 2014/0172775 | A1 | 6/2014 | Niehoff et al. |
| 2014/0172827 | A1 | 6/2014 | Nos et al. |
| 2015/0052032 | A1 * | 2/2015 | Aharoni ................. G06Q 10/00 705/30 |

OTHER PUBLICATIONS

Justin J. Levandoski et al., "Identifying Hot and Cold Data in Main-Memory Databases", in 2013 IEEE 29th International Conference on Data Engineering (ICDE), International Conference on Data Engineering, Apr. 8, 2013, (pp. 1-12, 12 total pages).

"European Office Action" dated Feb. 11, 2016, issued by the European Patent Office in corresponding EP Application No. 14171203. 4, 5 pages.

"Communication: Extended European Search Report", European Patent Office, dated Apr. 14, 2016, for European Application No. 15161323.9-1851, 11 pp.

* cited by examiner

400

410

412

| PO ID | Name | Address | State | Temperature |
|---|---|---|---|---|
| P132 | ~~~ | ~~~ | ~~~ | |
| P434 | ~~~ | ~~~ | ~~~ | |
| P562 | ~~~ | ~~~ | ~~~ | |
| P855 | John Smith | 123 Elm Street | New York | |

414

| PO ID | Name | Address | State | Temperature |
|---|---|---|---|---|
| P432 | ~~~ | ~~~ | ~~~ | COLD (Date) |
| P812 | ~~~ | ~~~ | ~~~ | COLD (Date) |
| P136 | ~~~ | ~~~ | ~~~ | COLD (Date) |
| P286 | ~~~ | ~~~ | ~~~ | COLD (Date) |

420

| PO ID | Name | Address | State |
|---|---|---|---|
| P763 | ~~~ | ~~~ | ~~~ |
| P002 | ~~~ | ~~~ | ~~~ |
| P987 | ~~~ | ~~~ | ~~~ |
| P338 | ~~~ | ~~~ | ~~~ |

FIG. 4

SYSTEMS AND METHODS TO MANAGE ONLINE ANALYTICAL AND TRANSACTIONAL PROCESSING FOR AN IN-MEMORY COLUMNAR DATABASE

BACKGROUND

A single database may be stored across multiple storage devices, with different devices being associated with different types of storage media. For example, a commonly accessed portion of the database, sometimes referred to as "hot" data, might be stored in a device that provides relatively fast access (and the cost of storage in such a device may be relatively expensive). A less commonly accessed portion of the database, sometimes referred to as "cold" data, might instead be stored in a device that provides relatively slower access (and the cost of storage may be less expensive as compared to the hot data device). By way of example only, the hot data might be stored in-memory while the cold data is stored on a hard disk drive. By dividing and storing hot and cold data separately, commonly accessed information may be quickly available to an end user without making the overall cost of the system too expensive.

Note that a database might be accessed for different types of reasons. For example, in one scenario an end user might generate an On-Line Analytical Processing ("OLAP") query to access the database (e.g., to support a year-to-year comparison of sales figures) while in another scenario he or she might instead want On-Line Transactional Processing ("OLTP") access (e.g., to create or change business data). Efficiently determining how to manage "hot" and "cold" data for these different scenarios, however, can be a difficult task.

BRIEF DESCRIPTION OF THE DRAWINGS

FIG. 4 is a tabular representation of portions of a database table according to some embodiments.

DETAILED DESCRIPTION

The following description is provided to enable any person in the art to make and use the described embodiments and sets forth the best mode contemplated for carrying out some embodiments. Various modifications, however, will remain readily apparent to those in the art.

For an in-memory database, the phrase "data aging" may refer to the storage of only the most relevant data in a Dynamic Random Access Memory ("DRAM") device, also referred to as "hot" data, while less relevant "cold" data resides primarily on a less expensive storage medium. In some cases, however, neither typical caching nor archiving and the corresponding access methods work well (with respect to performance and cost), such as when different usage scenarios need to be supported by the same database on a non-replicated single data model, especially when the database is associated with an in-memory database. By way of example, a "one size fits all" hot/cold database partition might not be satisfactory when both OLAP and OLTP scenarios need to be supported by a single database implementation. Such an approach may, for example, result in a bad compromise, e.g., by being too costly for OLTP use cases, by having too short of a data history, by not supporting an end user's potential decision to spend more money for DRAM for the sake of OLAP performance and quality, etc.

Moreover, columnar storage of an in-memory database may further aggravate the performance penalty when OLTP queries evaluate cold data (even if the data does not actually satisfy the end user's data selection—which is only known after the data is loaded) because the system may load a complete column (of a table or a partition) that contains the requested field, including all hot and cold data for that column. Further, many OLTP queries follow the (SQL-expressed) pattern of "SELECT*FROM table" and, as a result, the queries request that all columns (all data of the table/partition) be loaded into memory.

Figure 1:
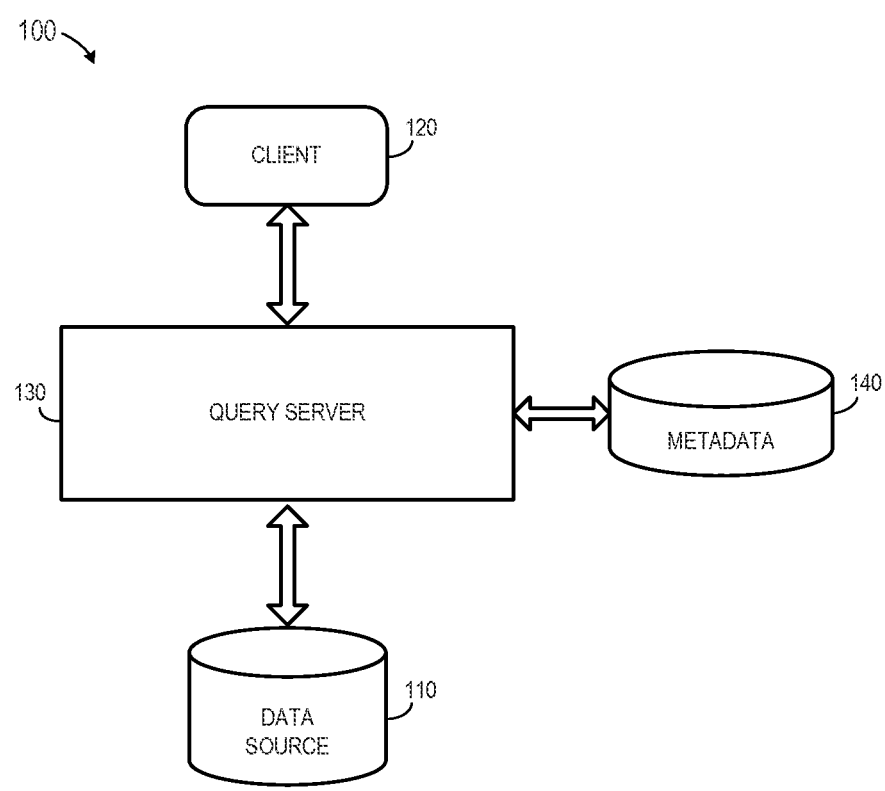
FIG. 1 is a block diagram of a system according to some embodiments.

To help avoid such compromises and performance penalties, FIG. 1 is a block diagram of a system 100 according to some embodiments. The system 100 includes a data source 110, a client 120, and a query server 130. The data source 110 may comprise any query-responsive data source or sources that are or become known, including but not limited to a Structured-Query Language ("SQL") relational database management system. The data source 110 may comprise a relational database, a multi-dimensional database, an eXtendable Markup Language ("XML") document, or any other data storage system storing structured and/or unstructured data. The data of the data source 110 may be distributed among several relational databases, warehouses, multi-dimensional databases, and/or other data sources. Embodiments are not limited to any number or types of data sources. For example, the data source 110 may comprise one or more OLAP databases, spreadsheets, text documents, presentations, etc.

In some embodiments, the data source 110 is implemented in Random Access Memory (e.g., "RAM" cache memory for storing recently-used data) and one or more fixed disks (e.g., persistent memory for storing their respective portions of the full database). Alternatively, the data source 110 may implement an "in-memory" database, in which volatile (e.g., non-disk-based) memory (e.g., RAM) is used both for cache memory and for storing its entire respective portion of the full database. In some embodiments, the data of the data source 110 may comprise one or more of conventional tabular data, row-based data stored in row format, column-based data stored in columnar format, and object-based data. The data source 110 may also or alternatively support multi-tenancy by providing multiple logical database systems which are programmatically isolated from one another. Moreover, the data of the data source 110 may be indexed and/or selectively replicated in an index to allow fast searching and retrieval thereof.

Metadata 140 may provide information regarding the structure, relationships and meaning of the data stored within the data source 110. This information may be generated, for example, by a database administrator. According to some embodiments, the metadata 140 includes data defining the schema of database tables stored within the data source 110. A database table schema may specify the name of the database table, columns of the database table, the data type associated with each column, and other information associated with the database table.

The query server 130 generally provides data of the data source 110 to reporting clients, such as the client 120, in response to instructions (e.g., SQL statements) received therefrom. In some embodiments, the query server 130 receives an instruction from the client 120. The query server 130 generates an execution plan based on the instruction and on the metadata 140. The execution is forwarded to the data source 110, which executes the plan and returns a dataset based on the SQL script. The query server 130 then returns the dataset to the client 120. Embodiments are not limited thereto.

The client 120 may comprise one or more devices executing program code of a software application for presenting end user interfaces to allow interaction with the query server 130. Presentation of an end user interface may comprise any degree or type of rendering, depending on the type of user interface code generated by the query server 130. For example, the client 120 may execute a Web Browser to receive a Web page (e.g., in HTML format) from the query server 130, and may render and present the Web page according to known protocols. The client 120 may also or alternatively present user interfaces by executing a stand-alone executable file (e.g., an .exe file) or code (e.g., a JAVA applet) within a virtual machine.

Figure 2:
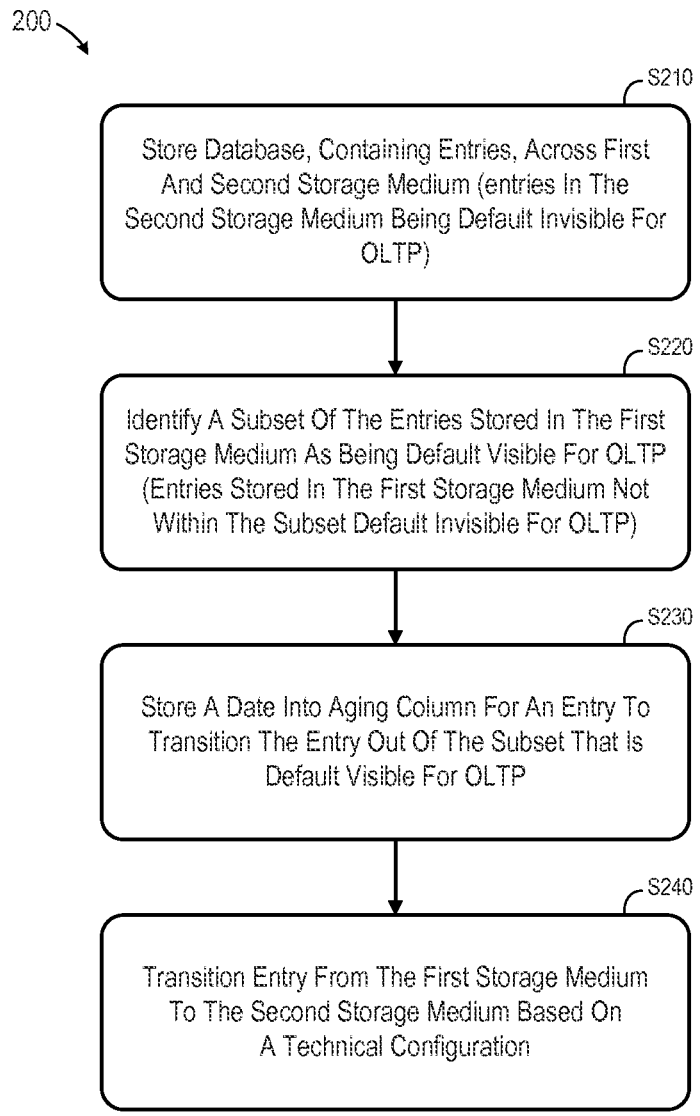
FIG. 2 is a flow diagram of a process according to some embodiments.

The elements of the system 100 of FIG. 1 may operate in accordance with any of the embodiments described herein. For example, FIG. 2 comprises a flow diagram of a process 200 according to one embodiment. In some embodiments, various hardware elements of system 100 execute program code to perform the process 200. The process 200 and all other processes mentioned herein may be embodied in processor-executable program code read from one or more of non-transitory computer-readable media, such as a floppy disk, a CD-ROM, a DVD-ROM, a Flash drive, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

Initially, at S210 a database containing entries is stored across first and second storage medium, with the entries in the second storage medium being default "invisible" for OLTP access. That is, a typical OLTP query generated by an end user will not return results associated with entries that are stored in the second storage medium (e.g., and thus, the entries in the second storage medium are "invisible" from an OLTP perspective). The entries in the first storage medium may be, for example, accessible by an application more quickly as compared to entries in the second storage medium. In some embodiments, the first storage medium comprises in-memory columnar storage and the second storage medium comprises disk-based storage.

Figure 3:
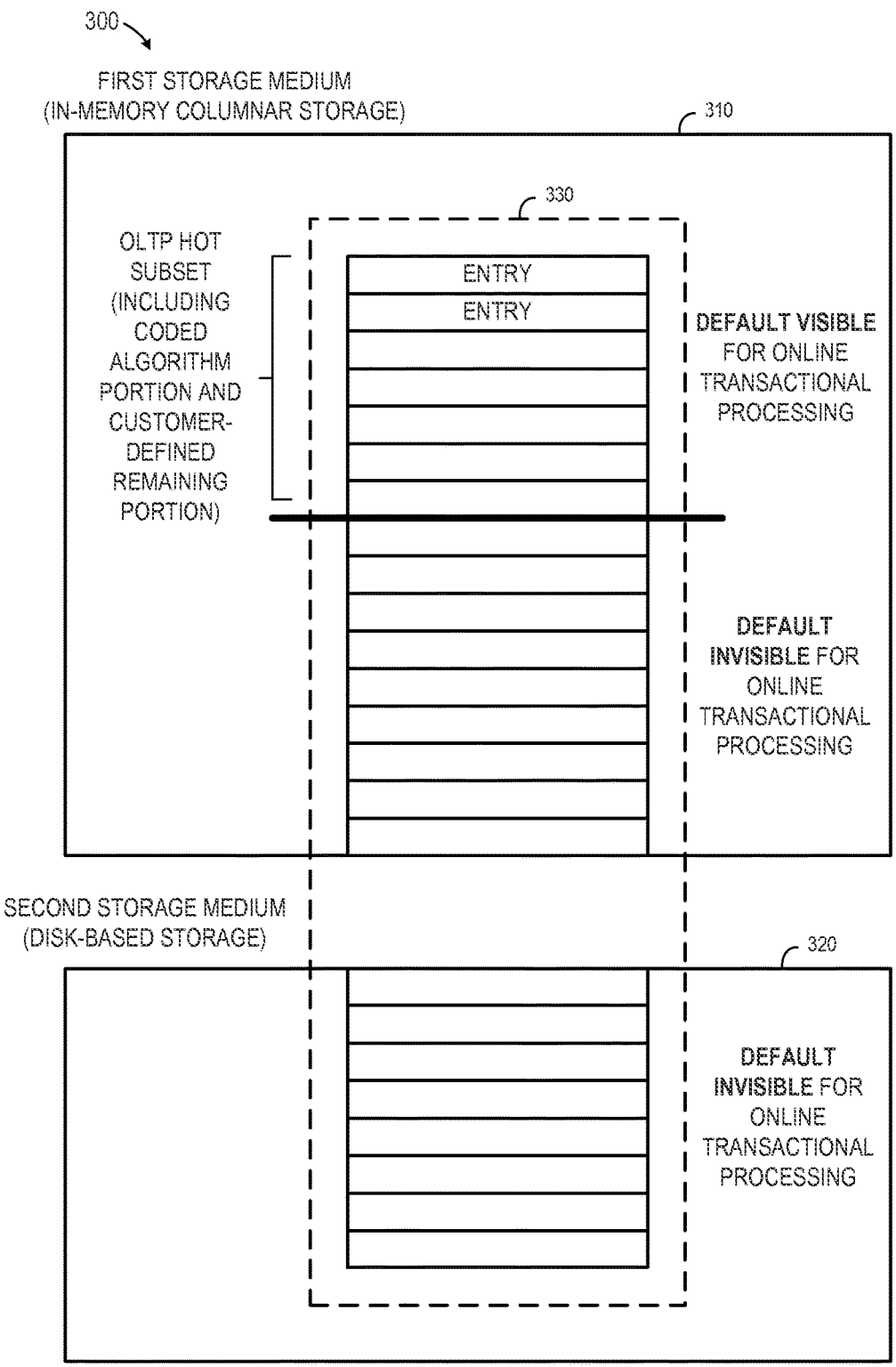
FIG. 3 illustrates data storage in accordance with some embodiments.

A subset of the entries stored in the first storage medium may be identified at S220 as being default "visible" for OLTP accesses. Moreover, entries stored in the first storage medium that are not within the subset are default invisible for OLTP accesses. Note that in some embodiments, as will be described herein, the invisibility of data may be achieved by automatic query re-writes in a generic client side layer of an application server of an OLTP application. The identification at S220 might be performed, for example, by a central software layer processor between the database and an application. Consider, for example, FIG. 3 which illustrates data storage 300 in accordance with some embodiments. The data storage 300 includes a first storage medium 310 (e.g., in-memory columnar storage) and a second storage medium 320 (e.g., disk-based storage). A database 330 having entries is stored such that it spans both the first storage medium 310 and the second storage medium 320. A subset of the database 330 in the first storage medium 310 is identified as being default visible for OLTP. That is, entries in that subset may be thought of as being "hot" data from an OLTP perspective. Entries in the first storage medium 310 that are not within the subset, as well as all entries stored in the second storage medium 320, are default invisible for OLTP, and may be considered "cold" data from an OLTP perspective.

According to some embodiments, determining some of the OLTP-hot subset of the database 330 may be based on check logic with coded algorithms at an application server on top of the database 330. The check logic may be associated with built-in conditions (e.g., hard coded) and pre-requisite checks based on status information (e.g., whether a financial document has cleared) and/or logical conditions (e.g., whether there is still an open order for delivery) that define a minimum set of OLTP-hot entries. Moreover, determining the rest of the OLTP-hot subset of the database 330 may be based on customer-defined residence time conditions. These customer-defined residence time conditions may be, for example, associated with business lifecycle data (e.g., a customer might decide that an entry associated with purchase order that was fulfilled within the last 30 days must always remain within the OLTP-hot subset).

Referring again to FIG. 2, an "aging" column may be added to the database, and the central software layer processor might store a date into the aging column for a particular entry at S230 to transition the entry out of the subset that is default visible for OLTP access. FIG. 4 is a tabular representation 400 of portions of a database table having entries according to some embodiments. Each entry may store, for example, a Purchase Order ("PO") identifier, a name, an address, a state, a delivery date, a total price, a currency indicator, etc. In particular, there is a first portion 412 (OLTP-hot representing the subset identified in FIG. 3) within a first storage medium 410, a second portion 414 (OLTP-cold) within the first storage medium 410, and a third portion 420 (also OLTP-cold) within a second storage medium. According to some embodiments, an aging column ("Temperature") is added to the first and second portions 412, 414 in the first storage medium 410. Entries having nothing in this aging column ("initial" state) are considered OLTP-hot and entries storing a "cold" indication (e.g., date information) are considered OLTP-cold. That is, writing a "cold" indication into the temperature column for the customer identifier entry "P855" of the first portion 412 will cause that entry to be moved to the second portion 414 (transitioning from hot to cold for OLTP). Note that as used herein, an entry storing "nothing" might refer to any value that is associated with the hot semantics. For example, an initial date of 00.00.0000 or 99.99.9999 might be chosen. In the case of 99.99.9999, a query including a subset of OLTP cold and hot data would just need to include "≥any date" in the where clause.

Referring again to FIG. 2, at S240 an entry may be transitioned from the first storage medium to the second storage medium based on a technical configuration. That is, a database entry may eventually migrate from the relatively fast storage medium to the relatively slow storage medium. The "technical configuration" might be based on the age of the data and/or a size of the first storage medium and may be selected based on performance goals versus total cost of ownership ideas.

Note that, as used herein, the idea of "hot" and "cold" storage may refer to where data resides so that it can be processed. In some cases, DRAM may be used for HOT data but in other cases additional persistent (permanent) storage of this data may be on disk. If the system can only operate on data when it is loaded into memory, aging may help minimize the set of data that must be loaded (and may be preloaded before it is actually needed) into memory as a relatively scarce and expensive resource. Cold data may remain primarily on disk and might not be loaded into memory before it is actually requested. Also, cold data may be loaded and unloaded differently so that hot data gets preference with respect to surviving in memory.

Figure 5:
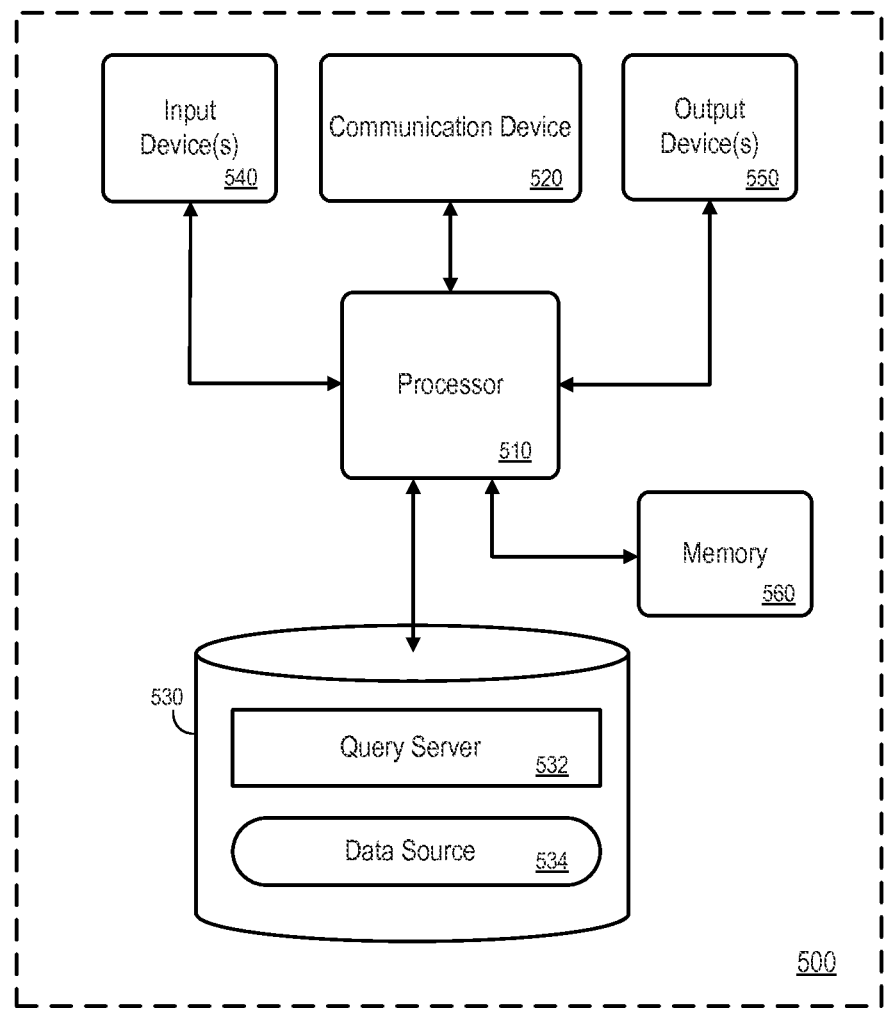
FIG. 5 is a block diagram of an apparatus according to some embodiments.

FIG. 5 is a block diagram of an apparatus 500 according to some embodiments. The apparatus 500 may comprise a general-purpose computing apparatus and may execute program code to perform any of the functions described herein. The apparatus 500 may comprise an implementation of the query server 130, the data source 110, or of the entire system 100 of FIG. 1. The apparatus 500 may include other unshown elements according to some embodiments.

The apparatus 500 includes a processor 510 operatively coupled to a communication device 520, a data storage device 530, one or more input devices 540, one or more output devices 550 and a memory 560. The communication device 520 may facilitate communication with external devices, such as a reporting client, or a data storage device. The input device(s) 540 may comprise, for example, a keyboard, a keypad, a mouse or other pointing device, a microphone, knob or a switch, an Infra-Red ("IR") port, a docking station, and/or a touch screen. The input device(s) 540 may be used, for example, to enter information into apparatus 500. The output device(s) 550 may comprise, for example, a display (e.g., a display screen) a speaker, and/or a printer.

The data storage device 530 may comprise any appropriate persistent storage device, including combinations of magnetic storage devices (e.g., magnetic tape, hard disk drives and flash memory), optical storage devices, Read Only Memory (ROM) devices, etc., while memory 560 may comprise RAM.

The query server 532 may comprise program code executed by processor 510 to cause apparatus 500 to perform any one or more of the processes described herein. Embodiments are not limited to execution of these processes by a single apparatus. A data source 534 may implement the data source 110 as described above. As also described above, the data source 110 may be implemented in volatile memory such as memory 560. The data storage device 530 may also store data and other program code for providing additional functionality and/or which are necessary for operation of apparatus 500, such as device drivers, operating system files, etc.

The apparatus 500 may implement any of the embodiments described herein. According to some embodiments, the apparatus 500 manages hot/cold management that serves both OLAP and OLTP scenarios on top of a columnar in-memory database. Note that embodiments are not restricted to columnar in memory databases. The same approaches may be applied in any type of database, such as by adding a temperature identification to entries. For a columnar database, the advantages of approaches described herein may be more substantial because the standard caching approaches might not be applicable. In particular, the apparatus 500 may, for OLTP, perform application checks periodically to decide which data qualifies for a transition from hot to cold (that is, which data should no longer be available for operational processes). These age checks might be based on status information (e.g. whether a financial document was cleared) and/or logical conditions (e.g. existence checks whether there is still an order for a delivery). The checks could be aligned with a default behavior so that, after aging, cold data entries are no longer visible, unless explicitly requested by an end user. Note that the alignment may be chosen so that the implemented business functionality may still work as expected with the now smaller subset of default visible data (e.g., a dunning run may still need to function and, as a result, open items might not be moved to cold storage).

According to some embodiments, the apparatus 500 may age data according to business lifecycle information known to OLTP applications and may also take customer preferences into account. For example, two-level checks might be performed: (1) built-in (logical) and (2) time-based (customer-controlled) checks might determine when to move hot data to cold partitions. The built-in checks may provide semantically correct query results when delivering only hot data to an end user. The additional time-based checks may allow for trade-offs between the convenience of having more data visible and quickly accessible versus the overall cost of the system.

The apparatus 500 may also manage OLAP queries such that the OLAP queries do not need to consider the complete data set of cold and hot data. Note that customers may configure the system to balance performance for more frequent OLAP queries versus the overall cost of the system (e.g., including a total main memory cost). Whether OLTP-cold data is placed on a disk right away or stays in-memory may be controlled by another configuration that takes the typical OLAP workload into account. That is, the apparatus 500 may decouple OLTP-optimized visibility from storage media allocation according to technical settings.

In contrast to typical data archiving, the apparatus 500 may keep the data completely in the database, within the same tables. Moreover, the transfer between hot and cold may take application knowledge into account. This is because the use of database statistics may be inherently suboptimal, or even not applicable, in real life systems may be avoided. As a result, the apparatus 500 may be simplified because no additional infrastructure is required for the purpose of data volume management. In addition, hot and cold data may be accessible and visible via standard SQL queries without needing to adjust client-side SQL code. In the case of OLAP queries with time constraints, the apparatus 500 may facilitate automatic filtering to the relevant data partitions to improve performance. Together with the idea of adjusting the range of hot data, the performance of important and frequent OLAP queries can be improved. Further, only minor adjustments might be required for OLTP type applications to enable access to cold data in the exceptional case when cold data is needed for some OLTP queries.

Figure 6:
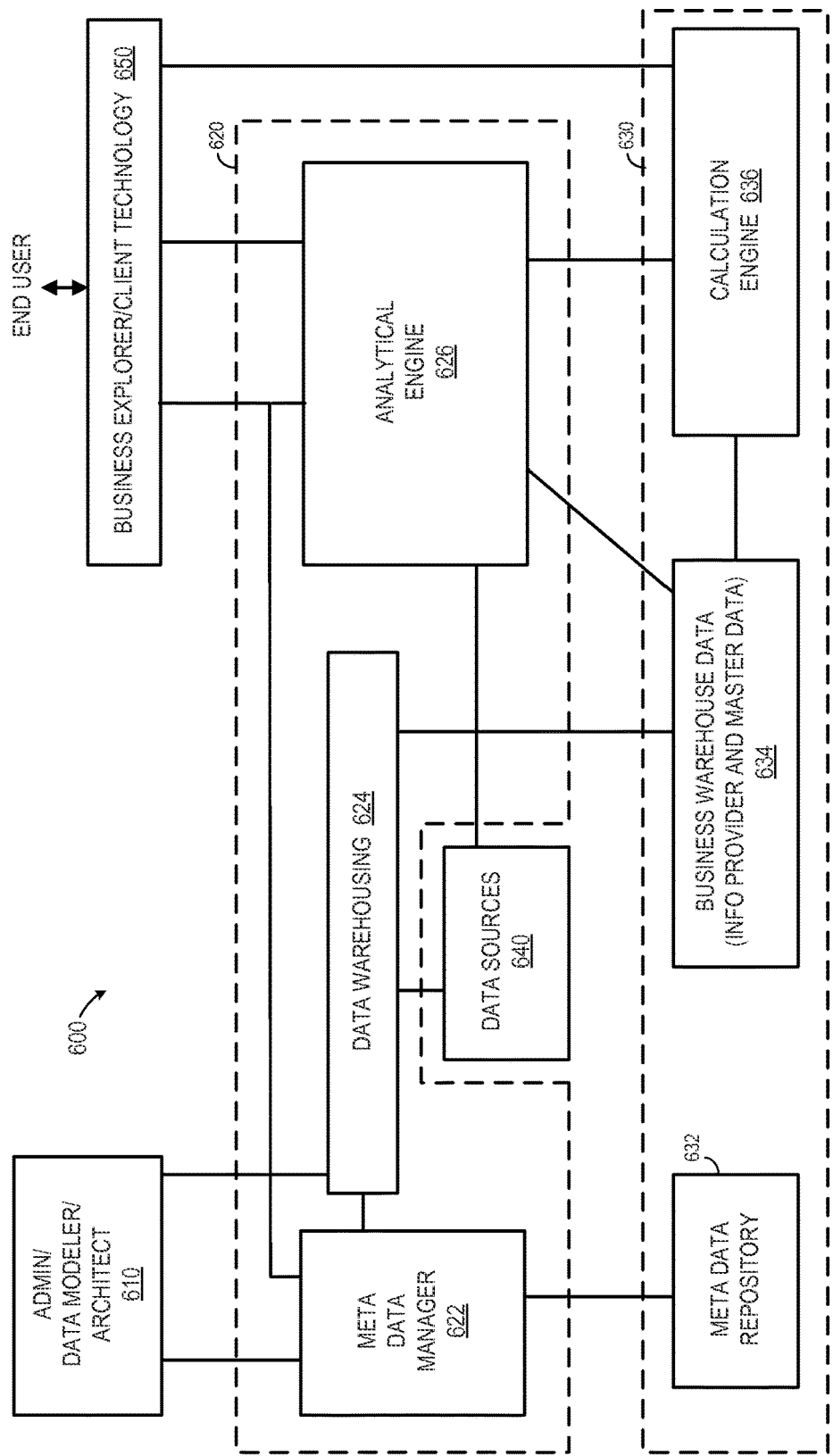
FIG. 6 illustrates an example of a system architecture in accordance with some embodiments.

FIG. 6 illustrates an example of a system architecture 600 in accordance with some embodiments. The system 600 may include an administrator/data modeler/architect component 610 that interacts with a business warehouse 620 to define a database 630. The business warehouse 620 may include, for example, a meta data manager 622 that communicates with a meta data repository 632 in the database 630. The business warehouse 620 may further include a data warehousing component 624 (e.g., to access data sources 640) and an analytical engine 626 that communicates with both the business warehouse data 634 and a calculation engine 363 of the database 630. In this way, an end user may utilize a business explorer/client technology component 650 to communicate with the business warehouse 620 and/or the calculation engine 636 of the database 630 in accordance with any of the embodiments described herein.

As compared to traditional systems, in-memory databases, especially those with columnar storage, may allow for more data can be processed (e.g., searched for, filtered, combined, aggregated, and/or updated) more quickly because disk Input Output ("IO") operations (of intrinsically higher latency and lower transfer rate than DRAM IO) are avoided. In addition, in-memory computing—and especially a column-wise data organization—may lead to new reporting applications (such as OLAP applications for year-to-year comparisons, planning, prediction, data mining, and/or sentiment analysis) as well as applications for creating and changing data (such OLTP applications). That is, OLTP and OLAP may no longer be separate systems with redundant data. Instead, OLTP and OLAP may represent different data usage scenarios within a single system 600.

As memory may be limited, because of technical limitations or cost considerations, more "relevant" data may be treated better as compared to less relevant data. For example, data archiving and/or caching may help accelerate access to recently used data. Note, however, that typical caching and/or archiving and corresponding access methods may be inadequate with respect to performance and/or cost if both usage scenarios (OLAP and OLTP) are combined on top of a single database on a non-replicated data model, especially if when the model is associated with an in-memory database.

According to some embodiments described herein, "hot" for OLTP is considered differently as compared to "hot" for OLAP in general, and this may be especially true in the case of columnar storage. For OLAP scenarios, a separation of data into "hot" and "cold" by time may be desired, because OLAP queries usually have a time restriction, and more recent data is queried much more often as compared to older data. Further note that OLAP may require a longer history of data (e.g., to support simulations, trend analysis, and year-to-year reporting) to be considered "hot" to support good query performance and result quality (e.g., the reliability of predictions). In contrast, OLTP typically only needs data for a shorter period of time (e.g., 3 months or 2 years). However, there may be important exceptions to this rule. For example, some data may need to be considered "hot" for a longer period of time (e.g., open items in financials). The list of open items for a customer might need to be produced quickly regardless of the creation date of the financial items. As a result, cutting off a query based on a time criteria, in an attempt to achieve good performance, may not be acceptable from a functional point of view. That is, a simple time-based separation of the data into hot and cold categories may not be sufficient to support OLTP processing. As another example, a dunning run may need to consider all open items. The achieve this, open items may be kept as long as needed in the hot area. Depending on detailed functional requirements, this may lead to the fact that some open items can never be moved to the cold storage. That is, while the application program selects open items for the dunning run, there may be no possibility to add a time constraint to the query.

Some embodiments described herein, such as the system 600 of FIG. 6, may allow for a balance between an overall price of the system 600 (e.g., including main memory cost) and the overall performance of the system 600 for a typical OLAP workload while still providing strong functional abilities for OLTP accesses.

According to some embodiments, the system 600 may be associated with application checks for OLTP that are periodically carried out to decide which data qualifies for a transition from "hot" to "cold," or which data shall no longer be available for operational reporting. The checks may be based on status information (e.g., whether a financial document was cleared) and/or logical conditions (e.g., existence checks whether there is still an order for a delivery). According to some embodiments, the checks are aligned with a default behavior so that, after aging, "cold" data is no longer visible unless explicitly requested by an end user. That is, the result of SQL queries that are issued against the database shall be correct from the end user's point of view even if only the "hot" data is returned.

These prerequisite checks that determine the minimum of the OLTP "hot" subset may comprise built-in conditions that are hard-coded. According to some embodiments, a time component may prolong the age of data entries (even after all built-in conditions are met for selected data). For example, a customer-configurable time might be passed before the data finally qualifies for the OLTP "hot" to "cold" transition. Such checks, which may correspond to a subsequent access and take residence time into account, may be implementable on a business object level. According to some embodiments, decision logic that is in place for determining the archivability of objects for data aging may be reused for this purpose. Note that, for a qualifying object, a fetched set of records from stored database tables might not be written into an archive file but instead only be marked as "cold" records.

As described with respect to FIG. 4, the system 600 may update an additionally introduced table column ("aging" or "temperature" column) with a value, such as a creation date of a business object, to indicate that an entry is OLTP "cold." This might be performed, for example, at the runtime of the aging process. In addition, at build time, tables may have been partitioned according to the aging column. Finally, all default accesses may be restricted to "hot" data by a query rewrite, such as " . . . WHERE aging_column IS NULL." Note that NULL might be replaced by any predetermined value (e.g., a date of 00.00.000 or 99.99.9999). This type of query rewrite may allow for partition pruning. For example, the system 600 may recognize that "cold" data does not contribute to the result and, as a result, data from partitions with filled aging values do not be loaded, providing improved response times for "hot" data.

Figure 7:
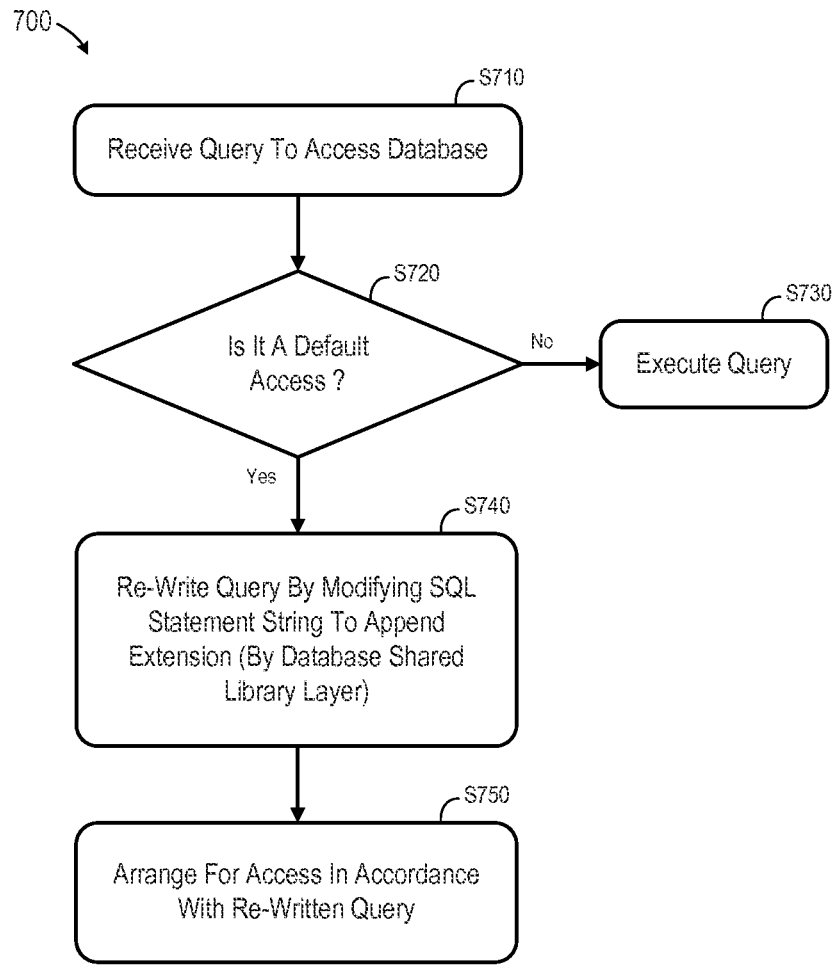
FIG. 7 is a flow diagram of a process to re-write queries according to some embodiments.

According to some embodiments, the system 600 may rewrite queries in a central software layer between the database and the application, such that only exceptional accesses to "cold" data will be signaled by the application. For example, FIG. 7 is a flow diagram of a process 700 to re-write queries according to some embodiments. A query to access a database is received at S710 and it is determined if the query is a "default" access at S720 (that is, a default query will not need to access cold data). If it is not a default access at S720, the query may be executed as normal at S730. If it is a default access at S720, the query may be re-written at S740. With such an approach, only a few coding places may need to be changed in the exceptional case, and the default visibility of "hot" data for the majority of the existing coding may work without changing the application. According to some embodiments, a query rewrite might not be implemented as appending an SQL WHERE condition in the usual SQL syntax. Instead, the system 600 may modify the SQL statement string, so that a statement extension (a special SQL syntax extension) is appended by a database specific connector/driver software module. Note that the "hot" partitions may be placed in memory and the "cold" partitions may reside in memory or on disk (to meet cost savings expectations). In either case, the system 600 may arrange for access to data in accordance with the re-written query at S750.

The system 600 may age data according to business lifecycle information known to OLTP applications while taking customer preferences into account. The two levels of checks may include (1) built-in (logical) rules and (2) time-based (customer controlled) rules to decide when to move OLTP "hot" data to "cold" partitions. The built-in checks help ensure semantically correct query results when delivering only "hot" data to the end user. The additional time-based checks may permit trade-offs between the convenience of having more data visible and accessible fast verses the overall cost of the system 600.

According to some embodiments, OLAP queries do not need to consider the complete data set of "cold" and "hot" data. For example, different "cold" and "hot" separations may be provided for OLAP as compared to OLTP. Note that the technical approach for OLAP may be similar to the implementation provided for OLTP, such as by using a time based criteria. For example, a date may be written to the aging column to trigger a move of the data from the "hot" to the "cold" partition. By further portioning the "cold" area into time ranges according to the aging column, the system 600 may further leverage partition pruning if OLAP queries contain the aging column as an additional filter criteria. This may reduce the search space of the queries, and, as a result, the queries may be executed more quickly. Note that the date and time criteria used in the OLAP queries to filter the data might not be exactly the aging column, because the set of records that has empty values in the aging column (i.e., the "hot" subset for OLTP) should also be included. However, the aging column may be closely related to the date and time criteria used in the OLAP queries for those entries where the aging column is present. In the simplest case, the aging column (if it is filled) may contain exactly the same value as the time criteria used in the OLAP query. As a result, the system 600 may expand the query with a filter on the aging column using the same filter as the time criteria of the original query while also allowing initial values in the aging condition:

where ... and (aging column between date_low and date_high or aging column is initial).

Note that SQL might only be aware that the aging column "IS NULL" instead of a value defined as "initial." When the aging column contains dates that are smaller than or equal to the time criteria, the system 600 may enhance the query by adding a minimal date equal to the time criteria:

aging column≥date_low or aging column is initial.

By ensuring (in embodiments that fill the aging column) that one of these two conditions is met, the system 600 may automatically add a filter to the aging column and thereby enable efficient partition pruning.

Some embodiments may enable the system 600 to be configured with respect to a balance between performance for more frequent OLAP queries and an overall price (including the cost of main memory). Whether OLTP-considered "cold" data is stored on a disk right away or stays in memory is controlled by a configuration that takes the typical OLAP workload into account. Thus, some embodiments may decouple OLTP-optimized visibility from storage media allocation according to technical settings. One way to achieve this is setting a capability limit on a partition level to decide whether "overflowing" data is no longer treated as "hot" (but is instead treated as "cold"). The minimum amount of data that needs to be placed in the "hot" subset are those partitions which contain initial values in the aging column (i.e., the column is empty) to support OLTP queries. However, to facilitate good performance for OLAP queries, the system 600 may also place the "younger" partitions of OLTP-aged data into the "hot" subset. This may be especially beneficial for reporting of relatively recent data, which may not visible by default in the OLTP part of an application (e.g., to support year to year or quarter to quarter comparisons and planning applications).

The foregoing diagrams represent logical architectures for describing processes according to some embodiments, and actual implementations may include more or different components arranged in other manners. Other topologies may be used in conjunction with other embodiments. Moreover, each system described herein may be implemented by any number of devices in communication via any number of other public and/or private networks. Two or more of such computing devices may be located remote from one another and may communicate with one another via any known manner of network(s) and/or a dedicated connection. Each device may comprise any number of hardware and/or software elements suitable to provide the functions described herein as well as any other functions. For example, any computing device used in an implementation of system 100 may include a processor to execute program code such that the computing device operates as described herein.

All systems and processes discussed herein may be embodied in program code stored on one or more non-transitory computer-readable media. Such media may include, for example, a floppy disk, a CD-ROM, a DVD-ROM, a Flash drive, magnetic tape, and solid state RAM or ROM storage units. Embodiments are therefore not limited to any specific combination of hardware and software.

Embodiments described herein are solely for the purpose of illustration. Those in the art will recognize other embodiments may be practiced with modifications and alterations to that described above.

What is claimed is:

1. A system comprising:
   a first storage device comprising a first type of storage medium;
   a second storage device comprising a second type of storage medium, wherein a database, containing entries, is stored across the first and second storage devices, entries in the second storage device being default invisible for online transactional processing; and
   a computing device comprising:
   a memory storing processor-executable program code, and
   a processor to execute the processor-executable program code in order to cause the computing device to:
   identify, at a central software layer processor between the database and an application, a subset of the entries stored in the first storage device as being default visible for online transactional processing by determining that an aging column of the database includes a null value for each entry of the subset of the entries, wherein entries stored in the first storage device that are not within the subset are default invisible for online transactional processing; and in a case that the aging column of the database comprises a non-null date associated with an entry of the subset of the entries, transitioning an entry out of the subset of the entries that is default visible for online transactional processing.

2. The system of claim 1, wherein entries in the first storage device are accessible by the application more quickly as compared to entries in the second storage device.

3. The system of claim 1, wherein the first type of storage medium comprises in-memory columnar storage and the second type of storage medium comprises disk-based storage.

4. The system of claim 1, wherein said identifying includes determining a portion of the subset using check logic implemented with coded algorithms at an application server on top of the database.

5. The system of claim 4, wherein said identifying further includes determining a remaining portion of the subset using customer-defined residence time conditions.

6. The system of claim 5, wherein the customer-defined residence time conditions are associated with business lifecycle data.

7. The system of claim 1, further comprising wherein a query from the application is automatically re-written to exclude entries not in the subset.

8. The system of claim 7, wherein the query is a structured query language statement and said re-writing comprises automatically appending a statement extension to the structured query language statement string.

9. The system of claim 1, wherein an entry is transitioned from the first storage device to the second storage device based on a technical configuration.

10. A computer-implemented method, comprising:
storing a database, containing entries, across a first type of storage medium and a second type of storage medium, entries in the second type of storage medium being default invisible for online transactional processing;
identifying, at a central software layer processor between the database and an application, a subset of the entries stored in the first type of storage medium as being default visible for online transactional processing by determining that an aging column of the database includes a null value for each entry of the subset of the entries, wherein entries stored in the first type of storage medium that are not within the subset are default invisible for online transactional processing; and
in a case that the aging column of the database comprises a non-null date associated with an entry of the subset of the entries, transitioning an entry out of the subset of the entries that is default visible for online transactional processing.

11. The method of claim 10, wherein entries in the first type of storage medium are accessible by the application more quickly as compared to entries in the second type of storage medium.

12. The method of claim 11, wherein the first type of storage medium comprises in-memory columnar storage and the second type of storage medium comprises disk-based storage.

13. The method of claim 10, wherein said identifying includes:
determining a portion of the subset using check logic implemented with coded algorithms at an application server on top of the database.

14. The method of claim 13, wherein said identifying further includes:
determining a remaining portion of the subset using customer-defined residence time conditions.

15. The method of claim 14, wherein the customer-defined residence time conditions are associated with business lifecycle data.

16. The method of claim 10, further comprising:
receiving, at the central software layer processor, a query from the application; and
re-writing the query, by the central software layer processor, to exclude entries not in the sub set.

17. The method of claim 16, wherein the query is a structured query language statement and said re-writing comprises:
appending, by a processor of a database specific connector/driver software module of the central software layer, a statement extension to the structured query language statement string.

18. The method of claim 10, further comprising:
transitioning an entry from the first type of storage medium to the second type of storage medium based on a technical configuration.

19. A non-transitory, computer-readable medium storing program code, the program code executable by a processor of a computing system to cause the computing system to perform a method, the method comprising:
storing a database, containing entries, across a first type of storage medium and second type of storage medium, entries in the second type of storage medium being default invisible for online transactional processing;
identifying, at a central software layer processor between the database and an application, a subset of the entries stored in the first type of storage medium as being default visible for online transactional processing by determining that an aging column of the database includes a null value for each entry of the subset of the entries, wherein entries stored in the first type of storage medium that are not within the subset are default invisible for online transactional processing; and
in a case that the aging column of the database comprises a non-null date associated with an entry of the subset of the entries transitioning an entry out of the subset of the entries that is default visible for online transactional processing.

20. The medium of claim 19, wherein entries in the first type of storage medium are accessible by the application more quickly as compared to entries in the second type of storage medium.

* * * * *